United States Patent [19]

Weir, Jr.

[11] 4,369,167

[45] * Jan. 18, 1983

[54] PROCESS FOR TREATING STACK GASES

[76] Inventor: Alexander Weir, Jr., 8229 Billowvista Dr., Playa Del Rey, Calif. 90291

[*] Notice: The portion of the term of this patent subsequent to Jul. 25, 1995, has been disclaimed.

[21] Appl. No.: 868,197

[22] Filed: Jan. 9, 1978

Related U.S. Application Data

[63] Continuation of Ser. No. 478,871, Jun. 13, 1974, Pat. No. 4,102,982, which is a continuation-in-part of Ser. No. 237,812, Mar. 24, 1972, Pat. No. 3,948,608.

[51] Int. Cl.$^3$ .................. B01D 47/00; B01J 8/00; C01B 17/00; C01B 21/00
[52] U.S. Cl. .................. 423/210; 423/235; 423/242; 55/73
[58] Field of Search .............. 423/242, 243, 244, 235, 423/239, 390, 393, 210 M, 210 R; 55/73, 201, 202

[56] References Cited

U.S. PATENT DOCUMENTS

| | | |
|---|---|---|
| 879,149 | 2/1908 | Cunningham ............... 423/242 UX |
| 892,516 | 7/1908 | Halvorsen ............... 423/390 |
| 1,888,547 | 11/1932 | Bent ............... 423/235 |
| 1,908,782 | 5/1933 | Pearce ............... 423/244 |
| 1,912,833 | 6/1933 | Fairlie ............... 423/235 |
| 1,985,010 | 12/1934 | Berkhuijsen ............... 261/115 |
| 2,215,707 | 9/1940 | Matanovich-Manov et al. ... 261/18 |
| 2,684,231 | 7/1954 | Pomykala ............... 423/242 |
| 2,833,528 | 5/1958 | Schroeder ............... 261/21 |
| 3,119,675 | 1/1964 | Gallagher ............... 55/257 |
| 3,522,000 | 7/1970 | Kinney ............... 23/2 |
| 3,616,597 | 11/1971 | Stewart ............... 423/242 UX |
| 3,758,081 | 9/1973 | Prudhon ............... 261/18 |
| 3,763,634 | 10/1973 | Alliger ............... 55/223 |
| 3,852,409 | 12/1974 | Martin ............... 423/242 |
| 3,927,177 | 12/1975 | Okabe et al. ............... 423/235 |

OTHER PUBLICATIONS

Weir, Scrubbing Experiments at the Mohave Generating Station, May 14, 1973.
The Condensed Chemical Dictionary, 6 Ed., 1961, p. 933.

*Primary Examiner*—O. R. Vertiz
*Assistant Examiner*—Gregory A. Heller
*Attorney, Agent, or Firm*—Lyon & Lyon

[57] ABSTRACT

Stack gases containing pollutant gases and particulate matter are passed through a defined flow path into which at least one selected liquid reagent is introduced in a prescribed manner to intimately contact the stack gases therein. The liquid reagent scrubs the stack gases and thereby removes a substantial portion of the pollutant gases and particulate matter therefrom. One reagent may be used or several different reagents may be employed at different stages of the flow path to best effect removal of various different pollutants contained within the stack gases. Removal of sulfur dioxide is accomplished by a highly reactive and substantially non-abrasive reagent, such as a lime solution and such solution further effects removal of materials in trace amounts in the stack gases such as mercury, bergillium and vanadium. Removal of nitric oxide and other materials in trace amounts is also accomplished by the process which includes as a reagent an oxidant.

34 Claims, 3 Drawing Figures

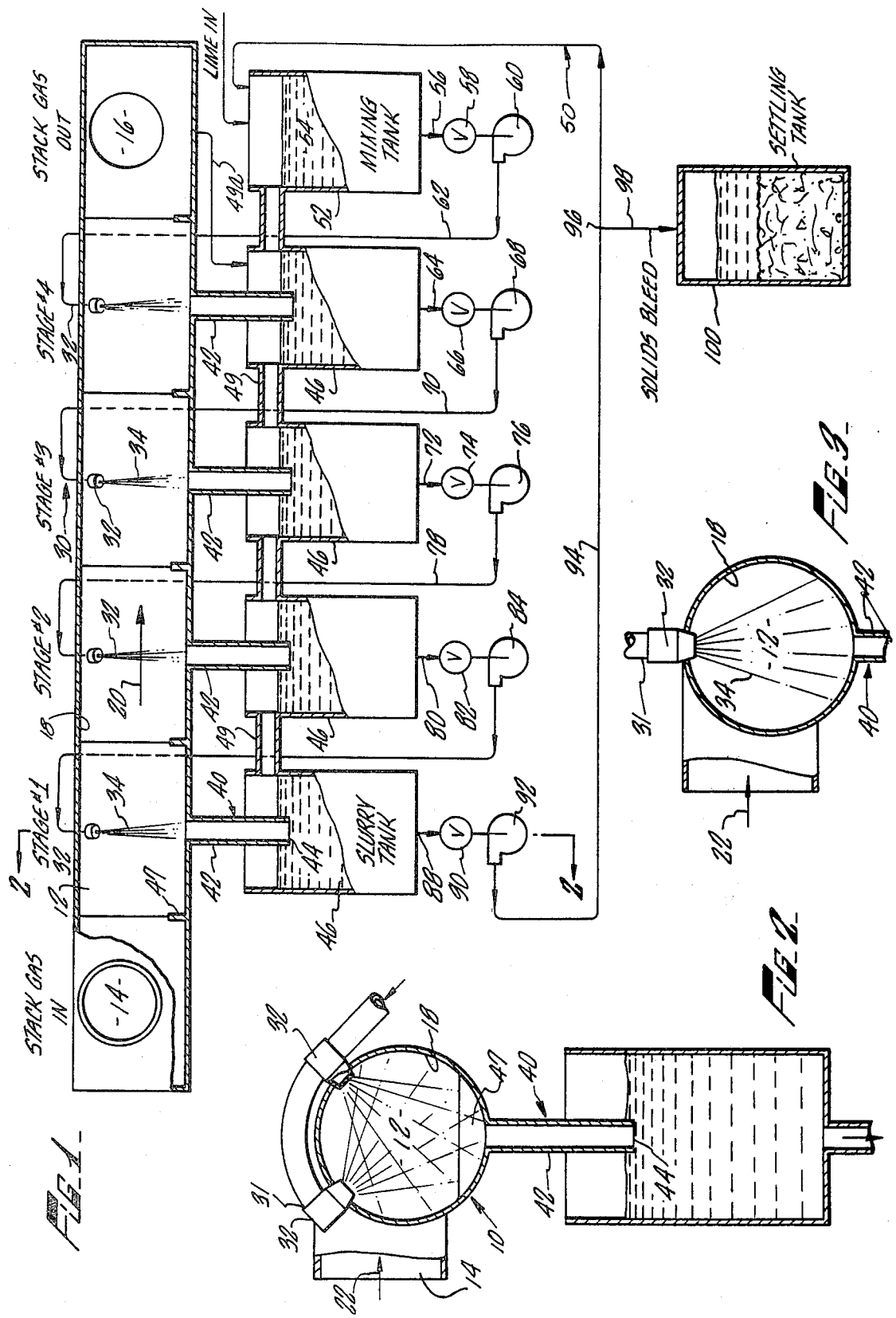

PROCESS FOR TREATING STACK GASES

This application is a continuation application of my U.S. application Ser. No. 478,871 filed June 13, 1974 which issued as U.S. Pat. No. 4,102,982 on July 25, 1978 which in turn is a continuation-in-part of my U.S. patent application Ser. No. 237,812 for Method and Apparatus for Treating Stack Gases filed Mar. 24, 1972 and which issued as U.S. Pat. No. 3,948,608 on Apr. 6, 1976.

The invention herein relates to a method or process for treating plant exhaust gases or so-called stack gases and more particularly relates to a method for wet scrubbing stack gases and thereby removing pollutants contained therein.

Stack gases generate various particulate and gaseous matter which contribute to air pollution. Of particular concern are the relatively heavy concentrations of sulfur dioxide found in stack gases created by plants and power generating stations burning fossile fuel. The use of low sulfur fuels would substantially reduce the amount of sulfur dioxide emitted, but the supply of such fuels is limited. Moreover, these stack gases also contain other objectionable pollutants including oxides of nitrogen, dust and trace amounts of other materials such as beryllium, arsenic, vanadium and mercury. Although the nitrogen oxides, primarily as NO, typically exist in stack gases in rather minute amounts, about 100 to 600 parts per million by volume, they are still a major component in the formation of photochemical smog. Mercury and the other trace elements, while not posing a photochemical smog problem, are toxic thereby creating a potential health hazard. Therefore, there is a present need for a system which will effectively reduce sulfur dioxide emissions. There is also a need for a process or system which is capable of controlling the emissions of nitrogen oxides and other pollutants.

Several methods and systems have been used in the past for removing and controlling such pollutants, but the effectiveness of each is limited. Hot or cold electrostatic precipitators, bag or filter houses, and mechanical precipitators such as cyclone separators are substantially limited to the removal of particulate matter. Scrubbers, particularly wet scrubbers, provide the most effective means for control of both particulate and gaseous pollutants. However, the wet scrubbers heretofore used are inherent with various problems.

The conventional wet scrubbers typically employ a vertical tower construction. Included within the wet scrubbers previously used and more particularly within scrubbing zone or the zone in which the pollutants are removed from the stack gases is some form of restriction of the cross-sectional flow area of the stack gases, normally either trays or packed beds of material or a venturi. This restriction in the flow path through the scrubber necessarily results in an increased pressure drop as the stack gases move through the scrubber which in turn can be detrimental to the operating efficiency of the plant. Thus, it is conventional to use several fans or other means requiring additional power to assist the flow of stack gases through the scrubber because of this pressure drop.

The bed or tray type scrubbers generally include trays, packed beds, sometimes in the form of marble spheres, or mobile beds, as for example light weight balls like ping pong balls, with a spray of reagent scrubbing liquor in the tower creating droplets which move downwardly against the direction of gas flow or counter-current thereto and onto the trays or beds. In either instance, these trays or beds present a geometric configuration on which particulate matter collects to at least partially plug the scrubber and thereby increase the pressure drop thereacross.

This problem of plugging is particularly severe in those scrubber systems employing a lime or calcium hydroxide reagent. Such a reagent is particularly desirable for the removal of sulfur dioxide because of its reactivity and cost. However, the product of the reaction of lime and sulfur dioxide is calcium sulfite/bisulfite which frequently oxidizes to calcium sulfate commonly known as gypsum in the hydrated form or plaster of paris when dehydrated. This calcium sulfate when reacted with the water present and allowed to set up forms a substance which will clog and plug the system to such an extent that frequent and extended shut downs of the entire scrubber will be required for removal of this substance. When fly ash is present in the stack gases, as occurs for example when coal is burned, a concrete-like substance is then formed which is even more difficult to remove.

The plugging problem associated with these bed or tray type wet scrubbers particularly directed to the control of sulfur dioxide emissions has been partially solved by using a less reactive reagent, such as limestone. However, this change to a less reactive reagent reduces the pollutant removal effectiveness of the system and in addition has created several new problems. For example, the limestone slurries are abrasive and cause erosion of the pumps and spray nozzles used in the system. Moreover, an external reaction tank or holding tank of substantial size is required because of the extended reaction time. Also, limestone is not readily available in certain areas and when shipping of the limestone is necessary it becomes less economical to use than a lime reagent which, in comparable amounts required for use in the scrubber systems, can be shipped at a significantly lower cost.

Aside from the increased pressure drop and general interference with the operation of the system caused by the plugging of the bed, there are other disadvantages associated generally with the vertical tower wet scrubbers wherein the scrubbing liquor droplets move counter-current to the stack gas flow. This counter-current flow factor alone probably contributes to a slight increase in the pressure drop. However, as the size of this type wet scrubber increases the nature of the enlarged vertical tower structure will result in further increases in the pressure drop if the pollutant control or collection efficiency of the scrubber is to be maintained or increased. This pollutant control or collection efficiency, if expressed in the logarithmic ratio of inlet concentration to outlet concentration of pollutant matter, is:

$$\log_e(C_i/C_o) = K(L/G)(E/r)(Z)(v_t/v_d)$$

wherein;

$C_i$ = inlet concentration
$C_o$ = outlet concentration
$K$ = a numerical constant containing unit conversion factors
$L/G$ = ratio of liquid to gas flow
$E/r$ = droplet efficiency fraction divided by the radius of the droplet
$Z$ = height of tower $v_t/v_d$ = velocity ratio of the settling velocity to the velocity of the droplet relative to the duct or tower wall Thus it can be seen that for a vertical tower counter-current wet scrubber an increase in the height and decrease in the diameter (because of the velocity ratio term) results in a higher logarithmic ratio of the inlet to the outlet concentration. To the stack gas flow this means, however, that increasing the collection efficiency will result in an increase in the gas pressure drop of the scrubber.

These vertical tower counter flow systems also require a rather sophisticated control arrangement to maintain a proper ratio of scrubbing liquid flow to stack gas flow. That is, the removal of the scrubbing liquid in this type scrubber is partially dependent on the stack gas flow and reduction of the gas flow could result in a flooding of the scrubber if unaccompanied by an appropriate reduction in the flow of the scrubbing liquid sprayed into the tower. Also, the downward counter-current flow of the reagent in such vertical tower scrubbers precludes the use of different reagents at different stages without a commingling of the reagents.

In addition, a vertical construction of the tower when enlarged requires an increase in the thickness of the wall material and thus additional construction costs in order to satisfy the new structural demands. Lastly, the vertical tower construction is rather undesirable from an aesthetic standpoint due to its impact on the skyline.

The venturi type wet scrubbers are generally less effective in removing pollutants from the stack gases than the bed or tray type wet scrubbers. Moreover, greater pressure drops are often associated with these venturi type scrubbers. In the venturi type scrubber the contaminated stack gas enters the venturi and is accelerated to a high velocity at the throat where it impinges upon a scrubbing liquid spray generally flowing in the direction of the gas flow or co-current thereto. This results in the atomization of the liquid. The high differential velocity between the gas and atomized droplets promotes impaction of the particles with the fine droplets. As the gas decelerates, further impaction and agglomeration of the droplets take place. After the pollutants have been trapped within the droplets, the resulting agglomerates are removed from the gas stream in a separator. The scrubbed gas enters the separator tangentially, spinning the liquid droplets against the wall and leaving at the upper part of the unit. The pollutant laden liquid drains by gravity to the bottom of the tower as the stack gas progresses upwardly. As indicated previously, the restriction created by the venturi in the stack gas flow path results in a significant pressure drop across the scrubber. Moreover, increased pollutant collection efficiency in this type scrubber is generally dependent on increased velocity at the throat thereby necessitating an even greater pressure drop.

Aside from the deficiencies and problems associated with the heretofore used scrubber apparatuses and processes, there are specific problems associated with the removal of certain pollutants, in particular nitric oxide and other pollutants which exist as minor components of the stack gas because removal thereof is complicated by the interference of the major components of the stack gas which monopolize the reagent.

Therefore, it is a primary object of the present invention to provide a wet scrubbing method which will effectively remove pollutants from stack gases with a minimal increase in pressure drop.

It is another object of the present invention to provide a process for the removal of sulfur dioxide from stack gases.

It is still another object of the present invention to provide a method directed particularly to the removal of sulfur dioxide which utilizes for wet scrubbing the stack gases a highly reactive and substantially non-abrasive reagent, such as a lime solution, while avoiding the plugging problems heretofore associated with such reagents.

It is further an object of the present invention to provide a method or process directed particularly to the removal of nitric oxide from stack gases.

Still another object of the present invention is to provide a wet scrubbing process for removing nitric oxide and other pollutants such as mercury which exist in the stack gas as minor components thereof.

Another object of the present invention is to provide a process for removing nitric oxide from stack gases containing relatively large amounts of water and other interfering components.

Moreover, with regard to both the bed type and the venturi type wet scrubbers heretofore used, they are as indicated previously because of the direction of the spray with respect to the flow of the stack gases both substantially limited to a single type reagent within a particular unit. This is considered a significant limitation because different reagents are more effective in removing certain pollutants. Therefore, still another object of the present invention is to provide a wet scrubbing method wherein various reagents are employed in stages within a single unit to effect removal of different pollutants.

In accordance with these and other objects, the present invention briefly includes, as a process for treating stack gases generally, the flow of stack gases through a substantially unrestricted and substantially horizontally extending chamber which defines a scrubbing zone. One or more reagents are sprayed, preferably at various stages, into the chamber with the liquid droplets therefrom moving across the path of flow of the stack gases. The pollutant laden liquid is washed from the chamber by the spray and discharges therefrom to be recycled, sewered or reclaimed. A lime solution is used as a reagent for the removal of sulfur dioxide. In a process directed particularly to the removal of nitric oxide and other pollutants which exist as minor components of the stack gases, such as mercury, beryllium, arsenic and vanadium there is included the novel steps of intimately contacting the stack gases with a reagent or liquid scrubbing medium comprising an oxidizing agent selected from the class consisting of an acid solution of an alkali metal dichromate and permanganate ion. This latter process may exist separately or as part of the above described unrestricted horizontal flow process for treating stack gases.

Still another object of this invention is to provide a wet scrubbing method which is relatively low in cost.

A still further object of this invention is to provide a method for wet scrubbing stack gases wherein pollutant collection efficiency is maintained or increased at large volumes of gas flow while still maintaining a minimum pressure drop across the scrubber.

These and other objects and advantages of the present invention will be made readily apparent from the following detailed description and accompanying drawings, wherein:

FIG. 1 in a diagrammatic side view of the present invention illustrating the horizontally extending wet scrubber chamber provided with a multiplicity of stages.

FIG. 2 is a sectional view taken substantially along the lines 2—2 of FIG. 1 and illustrating a preferred arrangement of the scrubbing liquid spray nozzles in the horizontal chamber.

FIG. 3 is a sectional end view similar to FIG. 2 illustrating another arrangement of the spray nozzles.

Referring now in detail to the drawings, the sometimes referred to unrestricted horizontal flow process of the present invention and the apparatus in which this process is preferably carried out are diagrammatically illustrated by FIG. 1 of the drawings. The scrubbing apparatus generally designated 10, includes a horizontally extending and cylindrical chamber 12 with a stack gas inlet 14 at one end thereof and a stack gas outlet 16 at the other end. While the cylindrical design of the chamber is generally preferable, economics may dictate a different design for large scrubbers, as for example a chamber rectangular or square in cross-section. The chamber 12 defines a scrubbing zone where removal of the pollutants from the stack gas passing therethrough is effected. As indicated by the drawings, the horizontally extending chamber 12 provides a uniform and unrestricted cross-sectional flow area throughout its length. The importance of this feature will become readily apparent from the following discussion.

The stack gases or plant exhaust gases enter the horizontally extending cylindrical chamber 12 at 14 preferably perpendicular to the direction of the path of gas flow defined by the inner cylindrical sidewall surface 18 of the chamber and indicated by the horizontal arrow 20. This necessitates a change in the direction of the stack gas flow after it enters the chamber 12 and effects a partial inertial separation of the particulate matter contained within the stack gases at the inlet end 14. As seen best in FIG. 2, the center axis of the inlet is offset with respect to the center axis of the chamber 12 whereby at least a portion of the entering stack gases flowing in the direction indicated by the directional arrow 22 enter tangentially with respect to the inner cylindrical sidewall 18. This creates a swirling or spinning action of the stack gases as they flow through the horizontal chamber 12 effecting further inertial separation of particulate matter and droplets from the stack gases flowing through the chamber 12. After the stack gases have progressed the length of the chamber 12, they exit the chamber through the outlet 16 which is also preferably perpendicular to the direction of gas flow in the chamber thereby effecting still another directional change of the stack gas flow and further inertial separation of particulate matter contained within the stack gases before exiting the chamber 12.

Spraying means, generally designated 30, include a plurality of spray elements 31 which spray a reagent or scrubbing liquid into the chamber 12 thereby causing liquid droplets therefrom to cover substantially the entire cross-sectional area of stack gas flow in the chamber at various stages along the length thereof. As shown in FIG. 1, each spray element 31 includes one or more spray nozzles 32 at the various stages along the chamber 12. Four stages are shown, but it should be recognized that the present invention is not limited to any particular number of stages. However, it is felt that the use of more than one spraying stage will reduce the flow rate of scrubbing liquid required through the scrubber system to effect a particular pollutant collection or control rate. Moreover, a plurality of spraying stages is considered particularly desirable where the stack gases enter the scrubbing chamber at a relatively high temperature.

Preferably, as shown in FIG. 2, a pair of nozzles 32 are located at each stage on the upper side of the cylindrical sidewall 18 with one nozzle spaced about 45° from each side of the vertical center line of the chamber 12. It has been found that this particular positioning of the nozzles 32 at each stage provides for a substantially complete curtain or sheet of liquid droplets across the cross-sectional area of flow of the stack gases in the chamber. However, more or less nozzles at each stage or at a particular stage along the chamber 12 may be preferable in certain instances. FIG. 3 represents a modified embodiment of the present invention wherein only a single nozzle 32 is employed at one or more stages. Where a single nozzle 32 is used it is generally preferable to locate this nozzle at the top of the inner cylindrical sidewall 18 along the vertical center line of the chamber. It should be noted in either instance, the nozzles 32 preferably direct a relatively narrow sheet of spray, as indicated by the phantom lines 34, across the chamber 12 substantially perpendicular to or cross-current to the flow of gas therein. The cross-current flow of the spray is generally desirable because it avoids interference with the spray at other stages, but there may be instances where it would be preferable to adjust slightly the direction of the spray in the chamber while still maintaining a substantially cross-current relationship between the gas flow and spray. For example, at relatively high volumes of gas flow it may be desirable to adjust the spray to a direction partly counter-current to the direction of stack gas flow to minimize the so-called problem of mist carryover wherein the spray droplets are carried out of the scrubber chamber by the stack gases. This is a problem often associated with the venturi type scrubbers wherein the spray is co-current to the gas flow.

An important feature of the present invention involves a self-washing action. A relatively large volume of scrubbing liquid is sprayed by the nozzle or nozzles at each stage with the liquid droplets emitted therefrom moving across the chamber 12 and eventually impinging on the sidewall 18. As the droplets of liquid move across the chamber 12 they create the scrubbing action of the stack gases passing therethrough by absorbing pollutant matter contained therein. This combination of pollutant matter and liquid reagent produces a liquid slurry which, due to the influence of gravity, naturally tends to drain downwardly to the bottom of the chamber. However, any of this liquid slurry which might otherwise collect on the sidewall is removed therefrom not only because of the gravitational drainage, but because of the washing action created by the subsequent impinging spray droplets.

Drainage means, generally designated 40, extend downwardly from the horizontal chamber 12 to remove therefrom the liquid slurry drained and washed to the bottom of the chamber. Preferably, the drainage means comprises a discharge pipe 42 at each stage of the chamber and axially positioned along the length thereof generally opposite the spray element 31. Each discharge pipe communicates the liquid slurry from the chamber 12 through a lower open end 44 thereof into an open tank 46, commonly referred to as a slurry tank. The discharge pipes or conduits are not absolutely necessary, but they are preferable because they tend to preclude splashing. As shown in FIGS. 1 and 2, vertically extending weirs 47 in the bottom of the chamber 12 separate each stage. The weirs 47 extend upwardly only a minimal distance into the chamber and in the flow path and thus have no appreciable effect on the flow of the gases therethrough. Although such weirs are not necessary and may be deleted in certain instances, the weirs 47 do tend to control the relatively high volume of liquid flow within the chamber.

When the present invention comprises a plurality of stages, such as shown in FIG. 1, it is generally preferable to provide separate slurry tanks 46 for each discharge pipe 42. An overflow line 49 preferably interconnects these various tanks whereby a more sophisticated control of the required pumps is avoided as will also be made apparent from the following discussion. In addition, there is also a discharge line or conduit 49a at the outlet end 16 of the scrubbing chamber 12 which communicates material therefrom to a slurry tank 46. While the chamber and tanks are shown as separate components it is also within the scope of the present invention to include the tank or tanks as an integral part of the chamber, but below the flow path of the stack gases.

Although a plurality of stages are shown, it should be recognized that in the particular embodiment of the invention illustrated, these stages are all part of a closed cycle for a single reagent. The following represents a discussion of this particular cycle, but thereafter, it will also be shown that the present invention could readily comprise a single unit with several different reagent cycles. Referring now in detail to the particular reagent cycle illustrated in FIG. 1, it should be noted that the reagent, in this particular instance, lime, is introduced into the cycle, generally designated 50, at a mixing tank 52. Here the lime is put into solution or slurry to form a scrubbing liquor 54. This scrubbing liquor 54 generally comprises calcium hydroxide or hydrated lime. This scrubbing liquor 54 is communicated by conduit means 56 through a check valve 58 to a pump 60. The pump 60 communicates the scrubbing liquor through conduit means 62 to the spray element 31 or in this particular instance, the pair of nozzles 32 at stage 4 of the scrubbing chamber 12. Stage 4 is generally adjacent the downstream outlet end 16 of the scrubbing chamber. The scrubbing liquor at stage 4 is sprayed by the nozzles 32 in a sheet across the chamber 12 and thus through the path of any stack gases flowing therein. As the spray droplets of calcium hydroxide move across the stack gases progressing through stage 4 of the chamber, they provide the so-called scrubbing action wherein they absorb particulate matter contained within the stack gases and also absorb certain of the pollutant gases and react chemically therewith.

In this particular instance, the calcium hydroxide scrubbing liquor reacts readily with the sulfur dioxide in the stack gases to produce calcium sulfite/bisulfite which then oxidizes to calcium sulfate, commonly known as gypsum or plaster of paris. This product of the reaction of the lime scrubbing liquor and sulfur dioxide together with the particulate matter, such as fly ash, collected by the spray droplets, forms the liquid slurry. This slurry if allowed to set up forms a concrete-like substance and is the substance which clogs and plugs the bed type wet scrubbers. However, in the wet scrubber of the present invention, this slurry on the cylindrical sidewall 18 of the chamber is washed therefrom by subsequent impinging droplets from the continuing spray and drains along the cylindrical sidewall 18 to the bottom of the chamber where it discharges through the discharge conduit 42 in communication with stage 4 of the chamber.

The discharge line 42 communicates the slurry to a slurry tank 46. This slurry from stage 4 is then communicated from the slurry tank by conduit means 64 through check valve 66 to a pump 68. This liquid slurry which still contains a substantial amount of unreacted calcium hydroxide is communicated by the pump 68 under pressure through conduit means 70 to the nozzles 32 of stage 3. These nozzles 32 spray this slurry liquid across stage 3 of the chamber and through the stack gases flowing therethrough to collect additional particulate matter and pollutant gases for reaction with the calcium hydroxide. The resulting slurry formed thereby is washed and drained from stage 3 of the chamber through a discharge conduit 42 in the same manner as described with respect to stage 4.

After discharge into a slurry tank 46, the slurry is communicated by conduit means 72 through a check valve 74 to the pump 76. Thereafter, pump 76 communicates the slurry liquid under pressure through conduit means 78 to the nozzles 32 of stage 2 wherein the scrubbing, washing, and discharge steps are repeated. The slurry from stage 2 is discharged into a slurry tank 46 and then communicated by conduit means through check valve 82 to the pump 84. The pump 84 then communicates the slurry of stage 2 under pressure through conduit means 86 to the nozzles 32 of the upstream stage 1 which is generally adjacent the inlet end 14 of the scrubbing chamber. Again, the slurry is sprayed across the chamber at stage 1 and again the steps of scrubbing of the stack gases passing therethrough, washing of the resultant slurry from the chamber and subsequent discharge into a slurry tank 46 are repeated. The slurry from stage 1 is communicated from the slurry tank 46 by conduit means 88 through check valve 90 to pump 92. Thereafter, this slurry is pumped through a re-cycling line 94. Within the re-cycling line 94 at 96, conventional means, such as a centrifuge, filter, or clarifier, are provided to separate solids contained within this slurry. The separated solids are thereafter discharged by conduit means 98 to a settling tank 100 for subsequent collection and disposal while the liquid continues through the re-cycling line 94 into the mixing tank 54 for repeated spraying at the various stages into the scrubbing chamber 12.

Although not shown, control means are provided within the cycle 50, preferably in communication with the liquid slurry discharged from stage 1, which adjusts the pH of the lime scrubbing liquor to maintain a predetermined stoichiometric ratio with respect to the calcium hydroxide-sulfur dioxide reaction. It has been found that a stoichiometric ratio lime solution in a range between 1.0 and 2.0 and preferably about 1.5 for a liquid flow rate at each stage between about 10–50 (GPM) and a gas flow rate of about 1000 (CFM), wherein the lime scrubbing liquid discharged from the upstream stage is slightly acidic (pH between about 6.0 and 7.0 and preferably about 6.5), is particularly effective for the removal of the sulfur dioxide from the stack gases.

Briefly summarizing the process of the cycle heretofore described, it should be noted that the stack gases after entering the scrubbing chamber 12, pass horizontally therethrough, and if desired in a swirling motion, toward the outlet end 16. At the four stages along the chamber, a reagent or scrubbing liquor, in this instance comprising calcium hydroxide, is sprayed in a sheet through the path of stack gas flow and substantially perpendicular or cross-current thereto thereby scrubbing the stack gases for removal of the particular and gaseous pollutants contained therein. As indicated previously, the spray droplets of scrubbing liquor absorb pollutants and react chemically with certain of the pollutants. The principle reaction involves the reaction of the calcium hydroxide with the sulfur dioxide contained within the stack gases to produce calcium sulfite/bisulfite, but it is also felt that there is at least a partial reaction involving the nitrogen oxides contained with the stack gases. The preferred process for removing nitric oxide is however discussed below and generally involves the use of a different reagent. The combination of the reagent or scrubbing liquor with the pollutants produces a liquid slurry which is washed by the spray and drained downwardly on the cylindrical sidewall 18 to the bottom of the scrubbing chamber 12. The slurry is then discharged from the chamber 12 into a slurry tank and thereafter pumped for spraying at another stage until it reaches the slurry tank associated with stage 1 at the inlet end of the scrubbing chamber. From this slurry tank 46 the liquid slurry is re-cycled back to the mixing tank 54 after solids have been bled therefrom into a settling tank. During the process, the stoichiometric ratio is maintained at a predetermined level to provide the most effective lime scrubbing liquor.

As indicated previously the lime reagent is generally preferred for wet scrubbing stack gases including heavy concentrations of sulfur dioxide. However, the overall process of the present invention is not intended to be restricted to this particular reagent and any reagent which will react with or absorb the pollutant in the gas which is being scrubbed, including brackish water and a limestone slurry, could also be used in the above described cycle 50.

The following specific examples of this above described cycle are submitted merely to illustrate the present invention and are not intended to limit it.

EXAMPLE 1

Exhaust gas from a low sulfur coal-fired furnace or a furnace fired with a mixture of natural gas and coal containing water either resulting from the combustion of natural gas or from feeding a wet slurry of coal into the furnace or both is passed through an air pre-heater. It should be recognized that the exhaust gas will be diluted somewhat with air leakage. This exhaust gas is then passed through an electrostatic precipitator which will remove most of the suspended fly ash. This gas, hereafter called the scrubber inlet gas, is at a temperature of 225° F. and an absolute pressure of 29.4 in Hg abs. and contains about 400 ppm $SO_2$ and 0.0125 gr/SCF of suspended fly ash (ranging in particle size from 0.2 to 10 microns in diameter). The composition of this suspended fly ash is about 53% $SiO_2$, 21% $Al_2O_3$, 6% $Fe_2O_3$, with the remaining 20% by weight being oxides of other metals in smaller amounts.

Each minute 68.08414 pounds of this gas enters the scrubber containing 0.00152 lbs. of suspended fly ash (i.e., 0.0125 gr/SCF) and 0.06053 lbs. of $SO_2$ (i.e., 400 ppm by volume) and 10.402 lbs. of $CO_2$, 5.675 lbs. of $O_2$, 4.895 lbs. of $H_2O$, 47.009 lbs. of $N_2$, 0.03511 lbs. of NO and 0.00598 lbs. of $NO_2$. At each stage the liquid reagent is sprayed into the cylindrical scrubber chamber at a rate of 37.5 GPM. Thus, the above amount of gas as it first progresses through the scrubber chamber contacts 37.5 gallons of an aqueous lime solution (whose pH is adjusted to 6.5 leaving the scrubber) sprayed through a nozzle at an inlet pressure of 10 psi gauge. The gas is contacted a second time with 37.5 gallons per minute of the aqueous lime solution, then a third time with 37.5 GPM of lime solution, and finally in the 4th stage, 37.5 GPM of the lime solution.

The pressure drop of the gas through the scrubber is 0.2 inches of water and its temperature at the outlet is 120° F. 68.66027 lbs. per minute of the gas leaves the scrubber at a flow rate of about 1,000 cu. ft./min. (the diameter of the circular scrubber is about 22 inches) and thus each minute leaving the scrubber there are 0.00042 lbs. of suspended fly ash particles (whose diameter is smaller than 0.3 microns) i.e., 0.0034 gr/SCF, 0.00276 lbs. of $SO_2$, i.e., 18 ppm (by vol) as well as 10.402 lbs. of $CO_2$, 5.675 lbs. of $O_2$, 5.530 lbs. of $H_2O$, 47.009 lbs. of $N_2$, 0.03511 lbs. of NO and 0.00598 lbs. of $NO_2$.

Thus, it can be seen that 0.635 lbs/minute of $H_2O$ is absorbed by the gas and 0.05777 lbs/minute of $SO_2$ and 0.00110 lbs/minute of fly ash are contained in the scrubbing liquid.

Preliminary data indicates that substantially none of the $CO_2$, $O_2$ or $N_2$ are removed with this scrubbing liquor. The solubility of $N_2$ is so slight that the amount dissolved is negligible compared to the quantity of $N_2$ in the gas. The solubility of $O_2$ is also slight, but some amount of $O_2$ reacts with the calcium sulfite in the scrubbing liquor to form calcium sulfate. However, the maximum amount that this would be is about 0.0144 lbs/minute, which is small compared to the 5.675 lbs/minute of $O_2$ in the gas so that the overall percentage of $O_2$ in the gas is not changed appreciably. It is also felt that some portion of the 0.00598 lbs/minute of $NO_2$ is absorbed by the scrubbing liquor. Absorption or desorption of $CO_2$ occurs in the scrubbing liquor depending upon the pH of the scrubbing liquor but a buffer zone exists in the pH region found to be optimum for $SO_2$ removal (i.e., pH=6.5) and hence no appreciable change in the $CO_2$ content of the gas occurs. Thus, it can be seen that four stages of scrubbing at an L/G of 37.5 GPM/1000 CFM result in the lowering of the $SO_2$ content of the gas from 400 ppm to 18 ppm with the dust loading being decreased from 0.0125 gr/SCF to 0.0034 gr/SCF.

The liquid slurry leaving the scrubber at each stage is collected in a 50 gallon tank so that a holding time of 45 seconds is realized between each stage. The pH of the liquid leaving the first stage is measured to be 6.5 in this tank. After the average holding time of 45 seconds, 98% of this 37.5 GPM of liquid (i.e., 36.75 GPM) is pumped to a mixing tank where sufficient lime is added so that the pH in the first stage tank is maintained at 6.5. It has been found that stoichiometric quantities (i.e., about 0.051 lbs/minute of CaO) are sufficient. At this time, sufficient water is added, about 6.864 lbs/minute, to compensate for the bleed-off (6.2 lbs/min), the liquid solution including the water added to the gas (0.635 lbs/min) and the water removed with the calcium sulfite/sulfate mixture (about 0.029 lbs/min). This is then pumped at 37.5 GPM from the mixing tank to the 4th stage nozzles. Leaving this stage, the liquid passes into the 50 gallon vertical tank below this stage. The liquid from this tank is then pumped at a rate of 37.5 GPM to the nozzles of the second stage. Leaving this stage, it drains into the vertical tank below the 2nd gas stage. The liquid from this tank is then pumped at a rate of 37.5 GPM into the nozzles of the first stage. It draws from this stage into the vertical tank below this stage where the pH is measured to be 6.5 as previously described.

The process thus operates in a continuous fashion with 37.5 gallons of liquid passing through the scrubber each minute, through four stages in a counter-current manner with 36.75 gallons being re-cycled and 0.75 gallons per minute being bled off which contains 73% of the fly ash entering the scrubber in the scrubber inlet gas and 95.5% of the $SO_2$ in the form of calcium sulfite and sulfate.

This solid material (predominantly $CaSO_4$) is then separated from the liquid in a conventional manner and the remaining liquor is returned to the mixing tank along with the necessary make up water so that 37.5 GPM of liquor can be circulated. The amount of this solid material would be about 0.0011 lb/min of fly ash and 0.123 lb/min as $CaSO_4$. Water of hydration 0.029 lb/min as well as that included in the sludge (20%) would also be an additional amount so that about 0.18 lb/min of sludge would be leaving the system.

Thus, in summary, very low absolute levels of $SO_2$ (18 ppm) and fly ash (0.0034 gr/SCF) were obtained utilizing this invention with a gas pressure drop of 0.2 inches of water and an L/G per stage for four stages of 37.5 GPM/1000 CFM. Plugging of the gas passage or the liquid lines did not occur after a six month testing period.

EXAMPLE 2

Exhaust gas resulting from the combustion of 3.0% sulfur oil in a utility boiler is fed directly (i.e., no electrostatic precipitator is present) to a 5.5 ft. diameter cylindrical horizontal scrubber at a gas flow rate of 33,200 SCFM (standard cubic feet—at 1 atmosphere pressure and 60° F.—per minute) where it is scrubbed with 664 gpm (gallons per minute of a lime slurry (i.e. at an L/G ratio per stage of 20 gpm/1000 SCFM). This scrubbing results in lowering the amount of various harmful constituents in the gas notably, $SO_2$ from 998 parts per million (ppm) to 105 ppm, $SO_3$ an sulfuric acid mist from 18 ppm to 9 ppm (expressed as $H_2SO_4.2H_2O$) as well as lowering the amount of "trace elements" contained in the exhaust gas.

Specifically in one hour of operation at these conditions, the weight of various harmful constituents entering and leaving the scrubber with the gas is as follows:

|  | Scrubber Inlet Gas lbs | Scrubber Exit Gas lbs | % Removal |
| --- | --- | --- | --- |
| $SO_2$ | 332.4 | 35.4 | 89.4 |
| $SO_3$ (as $H_2SO_4.2H_2O$) | 12.78 | 6.42 | 50 |
| As | $2.2 \times 10^{-4}$ | $1.0 \times 10^{-4}$ | 55 |
| B | $7.8 \times 10^{-3}$ | $1.4 \times 10^{-3}$ | 82 |
| Be | $1.4 \times 10^{-5}$ | $6.1 \times 10^{-6}$ | 57 |
| Cd | $8.2 \times 10^{-5}$ | $3.2 \times 10^{-5}$ | 61 |
| Cr | $1.2 \times 10^{-3}$ | $6.4 \times 10^{-4}$ | 70 |
| Hg | $3.8 \times 10^{-4}$ | $3.2 \times 10^{-4}$ | 16 |
| Mn | $7.6 \times 10^{-4}$ | $4.6 \times 10^{-4}$ | 40 |
| $N_i$ | $1.7 \times 10^{-1}$ | $1.1 \times 10^{-1}$ | 35 |
| Pb | $3.6 \times 10^{-3}$ | $2.6 \times 10^{-3}$ | 28 |
| V | $1.9 \times 10^{-1}$ | $1.6 \times 10^{-1}$ | 16 |

There are, of course, other constituents of the stack gas, $N_2$, $O_2$, $CO_2$, sometimes CO, $H_2O$ NO and $NO_2$. As discussed in the previous example, the amounts of these are relatively unchanged except for a reduction in $NO_2$ and an increase in the $H_2O$ vapor content (in the present example from 7980 lbs to 10,260 lbs).

To achieve this removal, 4640 lbs of water containing 421 lbs of $Ca(OH)_2$ are added to the scrubbing system and 2290 lbs of sludge are removed as a filter cake. This contains about 1550 lbs of water, 730 lbs of a mixture of calcium sulfate and calcium sulfite (in the ratio of 70% sulfite to 30% sulfate) and about 1.6 lbs of particulate matter containing the trace materials removed from the gas as well as other oil combustion ash constituents.

Thus, it can be seen that this process results in the removal of any undesirable constituents in the stack gas resulting from the combustion of high sulfur oil.

EXAMPLE 3

The gas resulting from the combustion of 0.4% sulfur coal in a utility boiler is passed through an electrostatic precipitator to a rectangular horizontal scrubber 30 ft. wide by 15 ft. deep at a flow rate of 480,000 SCFM (standard cubic feet—at 1 atmosphere pressure and 60° F.—per minute). It is scrubbed in each of four (4) successive scrubbing stages with 10,000 gpm (gallons per minute) with a lime slurry. The inlet concentration of $SO_2$ of 200 parts per million (ppm) is reduced to 6 ppm to achieve a reduction of 97% of the $SO_2$ in the exhaust gas. The opacity of the gas is reduced from 49% (as measured by a light transmittance meter) to 27% at the exit. This reduction in opacity is due to the reduction in concentration of fine particulate matter or "fly ash" contained in the exhaust gas resulting from the combustion of coal with 10% ash. Specifically, at the conditions outlined above, the gas leaving the electrostatic precipitator and entering the scrubber contains 0.0678 grains/SCF of fly ash, 68% (or 0.046 grains/SCF) of which is smaller in diameter than two (2) microns with 17% by weight (0.0114 grains/SCF) of the particles being smaller in diameter than 0.5 microns. The total "grain loading" of the gas leaving the scrubber is 0.0074 grains/SCF so that 89 weight percent of the particles of all sizes are removed. However, 79% by weight of these particles (0.00581 gr/SCF) are smaller in diameter than two (2) microns with 6% by weight (0.000445 grains/SCF being smaller in diameter than 0.5 microns. Thus, operating the scrubber at an L/G ratio per stage of 21 gpm/1000 SCFM not only results in removal of 97% of the $SO_2$ and 89% of the total particulate matter of all sizes, but also results in the removal of 87% by weight of all of the particles smaller than two (2) microns in diameter and 96% by weight of all of the particles smaller than 0.5 micron. The electrical power required to achieve this reduction (i.e. for forced draft fans to overcome the gas pressure drop, for pumps to pump the liquid slurry through the scrubber, thickener, and process tanks, and to operate instruments and controls), 3 megawatts, is less than 2% of the power generated by the electric generating unit which produced the 480,000 SCFM of exhaust gas.

Of particular note with respect to the overall scrubbing method of the present invention as described above, is the substantially unrestricted scrubbing zone defined by the chamber through which the stack gases flow. That is, the stack gases flow substantially uninterupted through the scrubbing zone except for the spray of scrubbing liquor. As shown by the above example, the present invention provides for a significantly high removal of pollutants from the stack gases, but the pressure drop occuring during the scrubbing operation is substantially minimized because of this unrestricted flow through the scrubbing zone. Moreover, it can be shown that pollutant removal is maintained or in some instances increased in a system for handling increased volumes of stack gas flow without increasing the pressure drop. Referring now to the pollutant control efficiency for this system, if expressed in the logarithmic ratio of inlet concentration to outlet concentration of pollutant matter, it is:

$$\log_e(C_i/C_o) = K(L/G)(E/r)(D)$$

wherein;

$C_i$ = inlet concentration
$C_o$ = outlet concentration
$K$ = a numerical constant containing unit conversion factors
$L/G$ = ratio of liquid to gas flow
$E/r$ = droplet efficiency fraction divided by the radius of the droplet
$D$ = Diameter of the scrubbing chamber or duct Thus, to increase the collection efficiency the diameter of the scrubbing chamber should be increased assuming that all of the other factors remain the same. However, increasing the diameter of the scrubbing chamber would also decrease the pressure drop of the stack gas so that for the same collection efficiency the wet scrubber of the present invention would have a lower pressure drop. This is in direct contrast to the heretofore used wet scrubbers where an increase in pollutant collection efficiency represented a similar increase in pressure drop.

Of similar importance is the self-discharging or washing aspects of the present invention. This is particularly important when a lime reagent is used for the removal of sulfur dioxide from the stack gases since the resulting product if allowed to set up forms a concrete-like substance which would clog and plug the scrubber. However, because the slurry is washed and removed from the scrubber chamber, there is insufficient time for such set up and thus plugging is avoided. Moreover, the rate at which the liquids are pumped through the cycle avoids a premature set up within the slurry tanks.

With respect to the use of a calcium hydroxide scrubbing liquor for the removal of sulfur dioxide, other advantages of the overall process of the present invention to be noted aside from the lack of plugging, include efficient pollutant control by maintaining a particular stoichiometric ratio, the reduction of equipment fatigue associated with the use of an abrasive liquor, and the solution of an air pollution problem without creating a water pollution problem. This latter advantage is achieved because the by-product material produced as a result of the calcium hydroxide and sulfur dioxide reaction is in solid form which is in contrast to the by-products produced when soluble reagents such as sodium compounds are used.

Moreover, as discussed more fully below, the horizontal cross-flow scrubber of the present invention also permits the use of several reagents in a single unit. In addition, the horizontal structure provides for lower construction costs since it is not necessary to support its own weight in the manner of a vertical structure and provides for a system which is less objectionable from an aesthetic standpoint.

The following relates to a process directed particularly to the purification of a gas stream containing minute amounts of nitric oxide and other trace elements, such as mercury vapor, which is in itself novel, but which is also particularly suitable as a part of the above described unrestricted horizontal flow process. With regard to the prior art directed to this specific process as distinguished from the previously described general overall process for treating stack gases, several technical articles dealing with analytical chemical techniques teach that various nitrogen oxides can be absorbed in sulfuric acid solutions of alkali metal dichromates. See for example, *Ind. Eng. Chem, Anal. Ed.*, pp. 660–3 (1941); *Zhur. Anal, Khim.* 4, pp. 292–7 (1949); *Japan Analyst* 2, 3–5 (1953). In addition, Romanian Pat. No. 50,557 teaches that sodium dichromate added to an ammonia synthesis gas washing liquid simultaneously eliminates nitrogen oxides and carbon dioxide and U.S. Pat. No. 1,765,254 discloses that gases such as $N_2O_3$ are absorbed in a solution of an alkali metal salt of an -ic acid of the metals of Group 6 of the Periodic Chart. It is also known that gases containing relatively high amounts of nitrogen oxides can be treated to produce colorless stack discharges by scrubbing the gas with an oxidant such as potassium permanganate. See *Journal of the Air Pollution Control Association* Vol. 4 pp. 122–247 (1971). The use of an aqueous solution of hydrogen peroxide as a reagent in purifying smoke from steam generating stations containing sulphur dioxide and possibly nitrogen oxides is also known. See U.S. Pat. No. 3,733,393.

The prior art further discloses that mercury can be removed from gas streams employing acidified permanganate solutions, *GIG. SANIT.* 11 (6), 27–33 (1946), and that metallic mercury reacts with dichromate solutions, particularly acidified dichromate solutions to produce various, substantially non-volatile mercury compounds depending upon the type of acid employed, *Bull. Soc. Chem.* 5 (4), 1803–11 (1937). However, the former reference indicates that the use of permanganate as a scrubbing medium for removal of mercury is undesirable because of its relatively short lifetime whereas the latter reference fails to suggest treatment of gases such as flue gas with dichromate solutions to render such gases suitable for release to the atmosphere.

In essence, none of the known prior art discloses the present process wherein a stack gas or flue gas stream containing nitric oxide as a minor component is intimately contacted with a liquid scrubbing medium comprised of an oxidizing agent, selected from the class consisting of an acid solution of an alkali metal dichromate and permanganate ion, which oxidizes at least a part of the NO to various other nitrogen containing species. Mercury vapor present in the flue gas is converted to less volatile mercury compounds and, accordingly, removed. If necessary, the effluent gas from this first scrubbing zone is either passed to a second scrubbing zone to chemically react with and remove any oxidized NO species such as $NO_2$, $HNO_3$, etc., formed in the first scrubbing zone, or, if economically desirable, the scrubbed gas containing any oxidized NO species can be passed through a separating and collecting zone for recovery of the oxidized NO species, e.g. nitric acid. In preferred form, when an acid-dichromate medium is used, the temperature of the dichromate scrubbing medium is maintained at a level so as to keep the vapor pressure of water above the scrubbing medium substantially equal to or greater than the partial pressure of the water in the gas being scrubbed.

In a flue gas or stack gas typical of those obtained when a fossil fuel such as coal or a petroleum derivative is being used as the energy source, the amount of $NO_x$, primarily NO, will range from approximately 0.01 to 0.15% by volume, rarely exceeding 0.5% by volume; whereas, the mercury content will range from about 0.2 to about 20% ppbv as mercury vapor. In such flue gases, other components such as sulfur oxides, carbon oxides and water are also present, the amount of water ranging generally from about 5 to about 13% by volume depending upon the precise fossil fuel employed.

Referring now in detail to the process, stack gases obtained as a combustion product of a typical fossil fuel enter the wet scrubber apparatus 10 which, as described more fully above, is a horizontal cross flow or crosscurrent scrubber wherein the gas to be scrubbed moves horizontally through a scrubber zone or chamber 12 and is contacted by a reagent or scrubbing medium introduced into the chamber 12 at least at one stage thereof in a spray through spray nozzles 32. However, it should be noted that this $NO_x$ removal process involving the novel steps of intimately contacting the gas stream with the particular medium defined can also be carried out, although less effectively, in other conventional gas-liquid scrubbing systems. The scrubbing medium, comprising either an alkali metal dichromate acid solution or a solution containing permanganate ion, such as a solution of potassium permanganate, eventually discharges the scrubber 10 in the form of a slurry.

Upon leaving scrubber 10, the scrubbing medium can be regenerated for re-cycle through the system. For example, in the case of the use of an acid-dichromate scrubbing medium, an electrolytic regeneration system can be used wherein any dichromate which has been reduced to chromium (III) is oxidized back to dichromate.

Under the conditions existing in the scrubber 10, at least some of the NO is converted to products wherein the nitrogen is in a higher oxidation state, at least a portion of which may pass, either entrained or as a vapor, with the scrubbed gas via outlet 16 from scrubber 10. However, most of the NO will remain as oxidized species in the scrubbing medium.

Operating parameters, such as flow rates, both gas and liquid, pressure, temperature, etc., in the scrubbing zone or chamber 12 will vary depending upon the amount of pollutants, particularly NO, in the gas to be scrubbed, the type of scrubber employed, the composition of the scrubbing medium, the volume of gas to be handled, etc. In general, pressure will be atmospheric or higher.

When the scrubbing medium employed is of the acid-dichromate type, the temperature in the scrubbing zone will be maintained at approximately within 30° C. of a level which will ensure that the vapor pressure of water in the scrubber is substantially equal to the partial pressure of the water in the gas to be scrubbed, and, in the preferred case, will be maintained at a level which ensures that the vapor pressure of water in the scrubber is substantially equal to the partial pressure of the water in the gas to be scrubbed. For practical purposes, at any given temperature, the vapor pressure of a concentrated sulfuric acid solution can be considered to be due to the partial pressure of the water in the sulfuric acid. Thus, for example, assuming that an 80% by weight sulfuric acid scrubbing medium is being employed and the gas to be scrubbed contains 10 mole percent water and further assuming that the scrubber is operated at a pressure of one atmosphere, the partial pressure of water in the scrubbed gas would be approximately 76 mm Hg. Thus, in order to obtain a water vapor pressure of 76 mm Hg above an 80% sulfuric acid solution, it is necessary to maintain the solution at a temperature of around 137° C. In the table below, equilibrium operating temperatures for this process of the present invention are shown as a function of the partial pressure of water in the scrubbed gas and the strength of the sulfuric acid being used.

| Flue Gas $H_2O$ Partial Pressure | Acid Strength (% wt.) | | | |
|---|---|---|---|---|
| | 50 (°C.) | 60 (°C.) | 70 (°C.) | 80 (°C.) |
| 76 mm | 66 | 80 | 103 | 137 |
| 84 mm | 68 | 82 | 105 | 140 |
| 92 mm | 70 | 84 | 107 | 142 |
| 100 mm | 72 | 86 | 110 | 144 |

As a general rule, temperatures in the scrubber will range from ambient up to about 190° C. when a dichromate medium is used. When a flue gas of the type described above is being scrubbed and a dichromate medium is used, the temperature in the scrubbing zone is most advantageously maintained at from about 60° to about 160° C., again depending upon the amount of water in the gas to be scrubbed and the strength of the sulfuric acid.

In order to carry out the $NO_x$ removal process of the present invention in the most economical and efficient manner, and, if necessary, it is desirable that the scrubbing medium be regenerated and recycled to the scrubbing zone. In the case of a dichromate medium, the reaction between the NO and the dichromate results (among other reactions) in the oxidation of the NO and a consequent reduction of the dichromate to chromium (III). Thus, to avoid the necessity for the excessive addition of make-up dichromate to the scrubbing medium, it is preferable that the chromium (III) be oxidized back to dichromate. This can be conveniently carried out by an electrolytic technique wherein the dichromate is regenerated from chromium (III), the regeneration process being carried out in a cell employing a suitable anodecathode couple which minimizes the overall cell voltage. One such electrode system comprises a lead dioxide anode and a 316 stainless steel cathode. Preferably, the electrolytic regeneration is carried out in a two compartment cell separated by a membrane which substantially keeps dichromate out of the cathode compartment and in which the sulfuric acid concentration ranges from about 55 to about 60% by weight. However, the acid concentration can range from about 40 to about 80% by weight. It should be noted in this regard that in the electrolytic regeneration process involving the dichromate medium, to obtain optimum current efficiencies, it may be necessary to adjust the acid concentration of the feed to the regeneration zone to the desired level and then readjust following regeneration, if necessary.

As in the case of the dichromate, it is possible to regenerate the permanganate, which, upon reaction with NO, is converted to compounds containing manganese in a lower oxidation state such as manganese dioxide. It is to be understood that the reaction between either the dichromate scrubbing medium or the permanganate scrubbing medium with the mercury vapor also results in the conversion of the dichromate or the permanganate to compounds in which the chromium or manganese is in a lower oxidation state. Although only electrolytic regeneration has been discussed above, it will be understood that other regenerative processes may be employed depending on which sorbent is employed and the types of reduction products obtained.

Although phosphoric and other acids can be employed when the scrubbing medium is of the acid-dichromate type, it is preferable that sulfuric acid be employed, the concentration of the sulfuric acid generally ranging from about 40 to about 90% by weight and preferably from about 50 to about 85% by weight. On a strictly stoichiometric basis, it is desirable that the scrubbing medium contain at least one mole of dichromate for every two moles of NO in the gas to be scrubbed. Assuming complete reaction, this ensures that all the NO will be converted to nitrate. As a practical matter, however, the reaction does not proceed to completion, and it has been found that NO removal increases with increasing dichromate concentration. However, the decomposition of dichromate in a sulfuric acid solution is concentration dependent and the rate of decomposition increases with increasing concentrations of dichromate. Thus, to minimize raw material costs without sacrificing scrubbing efficiency, it is desirable that the scrubbing medium contain an amount of dichromate which will, within practical limits, effectively remove the NO present in the gas stream but yet will not be so high that the rate of decomposition of the dichromate exerts a deleterious effect on the economics of the process. In general, it has been found that when a typical flue gas is being scrubbed, dichromate concentrations ranging from about 0.1 to about 3% by weight and more preferably from about 0.3 to about 1.5% by weight of the scrubbing medium can be used.

As indicated above, operating parameters in the process of the present invention and particularly in the oxidizing scrubbing zone will vary depending upon the factors noted above. Thus, for example, when a permanganate containing scrubbing medium is employed, the temperature in the scrubber can range from below ambient up to the boiling point of the scrubbing medium but more generally will range from about 100° F. to about 210° F., pressures ranging from sub-atmospheric to super-atmospheric.

Unlike the case of the acid-dichromate scrubbing medium, the permanganate scrubbing medium can be acidic, basic or neutral, neutral to basic solutions being preferred. In particular, a permanganate scrubbing medium wherein the pH is from about 6 to about 12 is especially preferred, when it is desired to achieve maximum removal of the NO from the flue gas and sulfur oxides are absent. Suitable buffering agents such as sodium bicarbonate can be employed to maintain the pH of the scrubbing medium at the desired level. When an acid permanganate solution is employed as a scrubbing medium, virtually any mineral acid can be employed, although it is preferred to use acids such as phosphoric or sulfuric, sulfuric being especially desirable. The acid concentration, when an acid is used in the permanganate scrubbing medium, will range from about 0.05 to about 20% by weight with the permanganate concentration ranging from about 1.0 to about 20% by weight.

As noted, in terms of removing NO from flue gas streams, it is preferred that the permanganate scrubbing medium be neutral or basic. However, in order to efficiently employ basic permanganate solutions for the removal of NO from flue gas streams, it is necessary to effect preliminary removal of any $SO_2$, since $SO_2$ absorption into the alkali permanganate results in the lowering of pH and a concomitant lowering of the ability to remove NO. When a neutral or basic solution of permanganate is employed, the concentration of permanganate employed in the scrubbing medium will generally range from about 0.05 to about 1.0 moles per liter. It is to be observed that, unlike the case of NO removal, the removal of mercury from the gas stream is as efficient at low as at high pH values.

The following nonlimiting examples are presented to more fully demonstrate this $NO_x$ removal process both as a separate process employed in conventional scrubber systems and as part of an overall scrubbing process wherein the stack gases are passed through a horizontal scrubbing chamber.

EXAMPLE 4

A typical flue gas such as is obtained as a combustion product of coal is scrubbed in a dichromate scrubbing system similar to that described above. The flue gas to be scrubbed has the following composition:

| Component | Concentration |
| --- | --- |
| $N_2$ | 68% mol |
| $H_2O$ | 11% mol |
| $CO_2$ | 13% mol |
| $O_2$ | 7% mol |
| $SO_2$ | 250 ppm |
| NO | 400 ppm |
| Other | Trace |

The recirculation scrubbing medium employed has the following general composition:

| Component | Weight Percent |
| --- | --- |
| $H_2O$ | 16.0 |
| $H_2SO_4$ | 64.0 |
| $Na_2Cr_2O_7$ | 0.5 |
| $Na_2SO_4$ | 5.1 |
| $Cr_2(SO_4)_3$ | 14.2 |

The scrubber employed is a four-stage horizontal cross-flow spray scrubber operated under the following conditions:

| | |
| --- | --- |
| Scrubber medium flow rate | 300 gal/min |
| Scrubber temperature | 280–290° F. |
| Flue gas temperature | 260–300° F. |
| Flue gas flow rate | 500–3,000 SCFM (STP-60° F., 1 ATM) |

It is found that under the above conditions, 90% of the nitric oxide present in the flue gas is converted to nitric acid.

EXAMPLE 5

Various gas blends simulating typical power plant flue gas streams were prepared. These blends were then processed in a laboratory scale scrubbing system. The system employed a two-inch diameter countercurrent scrubber containing one sieve tray equipped with liquid downcomers. Sampling connections were provided on both the gas and liquid streams entering and leaving the scrubber. On line vapor measurement of NO and $NO_2$ were supplied using a photometric technique while wet chemical methods were used to obtain liquid phase analytical results on dichromate, nitrite and nitrate concentrations. Since the overhead vapor from the dichromate scrubber contained relatively large amounts of water (10% mol), a quench column was installed to cool the gas and condense the water before obtaining an effluent gas suitable for analysis. In order to obtain a more accurate material balance on the $NO_x$ species in the runs, the effluent liquid (condensate) from the quench column was collected and the amount of nitrate and nitrate therein determined. The cooled effluent gas was then passed through a caustic bubbler to remove the oxidized NO species such as nitric acid. The caustic in the bubbler was also analyzed for nitrate and nitrite content. The results of the various runs are shown in Table I below. In the runs wherein the gas blend contained no $SO_2$, only $N_2$ and NO were present. For runs in which $NO_2$ and $SO_2$ were present, the blends contained in addition $N_2$, $CO_2$ and $O_2$.

TABLE I
EXPERIMENTAL NO SCRUBBING DATA
(Scrubbing Solution. $K_2Cr_2O_7$ in Concentrated $H_2SO_4$)
(Column Internals: One Sieve Tray)

| Run Number | Gas Flow (SCFH)[a] | Scrubber Vapor Phase Data (ppm volume) | | | | | | Caustic Bubbler Vapor Data | | Scrubber Liquid Flow (lb/hr) |
|---|---|---|---|---|---|---|---|---|---|---|
| | | Inlet Gas | | | Outlet Gas | | | Flow Rate (SCFH) | Sample Time (min.) | |
| | | NO | $NO_2$ | $SO_2$ | NO | $NO_2$ | $SO_2$ | | | |
| 1 | 51 | 500 | 0 | — | 30[b] | 20[b] | — | 4.0 | 10.3 | 3.6 |
| 2 | 51 | 480 | 0 | — | 65[b] | 20[b] | — | 4.0 | 10.0 | 1.2 |
| 3 | 76 | 540 | 0 | — | 85[b] | 15[b] | — | 4.0 | 10.0 | 2.0 |
| 4 | 51 | 480 | 0 | — | 100[b] | 20[b] | — | 4.0 | 10.0 | 0.66 |
| 5 | 76 | 500 | 0 | — | 195[b] | 15[b] | — | 4.0 | 11.0 | 0.66 |
| 6 | 50 | 535 | 0 | — | 260[b] 260[c] | 30[b] 50[c] | — | 4.0 | 21.0 | 2.7 |
| 7 | 50 | 510 | 0 | — | 240[b] | 30[b] | — | 4.0 | 20.0 | 1.3 |
| 8 | 50 | 470 | 30 | 475 | 250[b] | 50[b] | 240[c] | 4.0 | 15.0 | 1.3 |
| 9 | 50 | 470 | 20 | 460 | 270[b] | 50[b] | — | 4.0 | 15.0 | 2.7 |
| 10 | 50 | 460 | 20 | 530 | 255[c] | 85[c] | — | — | — | 2.7 |
| 11 | 54 | 550 | 20 | 470 | 340[c] 370[d] | 80[c] 80[d] | 140[c] 200[d] | — | — | 2.5 |
| 12 | 54 | 550 | 20 | 470 | 370[c] 345[a] | 80[c] 75[d] | 170[c] 215[d] | — | — | 11.5 |
| 13 | 50 | 505 | 35 | 510 | 290[c] 290[d] | 75[c] 70[d] | — | — | — | 1.8 |
| 14 | 50 | 475 | 35 | 500 | 285[c] 295[d] | 85[c] 80[d] | — | — | — | 4.4 |
| 15 | 50 | 460 | 30 | 500 | 250[c] 250[d] | 90[c] 90[d] | — | — | — | 4.3 |

| Run Number | Scrubber Liquid Phase Data (lb-moles/$10^3$ lb-soln) | | | Quench Column Liquid Data (lb-moles/$10^3$ lb-soln) | | Caustic Bubbler Liquid Data (lb-moles × $10^{-3}$) | | Scrubber Temp (°C.) | $H_2SO_4$ Conc. (Wt. %) |
|---|---|---|---|---|---|---|---|---|---|
| | $Cr_2O_7^=_{out}$ | $Cr_2O_7^=_{out}$ | $NO_3^-_{out}$ | $NO_2^-$ | $NO_3^-$ | $NO_2^-$ | $NO_3^-$ | | |
| 1 | .0386 | .0278 | .00177 | .00002 | .00398 | .012 | .123 | 140 | 78.7 |
| 2 | .0386 | .0129 | .00179 | .00004 | .00380 | .019 | .145 | 142 | 78.7 |
| 3 | .0386 | .0192 | .00219 | .0 | .00292 | .020 | .137 | 140 | 78.7 |
| 4 | .0386 | .0027 | .00213 | .0 | .00209 | .030 | .203 | 140 | 78.7 |
| 5 | .0386 | .0034 | .00233 | .00097 | .00326 | .037 | .262 | 140 | 78.7 |
| 6 | .0475 | .0394 | .00199 | .00013 | .00084 | .247 | .064 | 81 | 60.1 |
| 7 | .0475 | .0304 | .00339 | .00021 | .00130 | .236 | .081 | 80 | 60.1 |
| 8 | .0475 | .0257 | .00339 | .00009 | .00185 | .115 | .106 | 80 | 60.1 |
| 9 | .0475 | .0376 | .00177 | .00003 | .00109 | .128 | .070 | 80 | 60.1 |
| 10 | .0549 | .0512 | .00187 | .00005 | .00078 | — | — | 80 | 58.8 |
| 11 | — | .136 | .00092 | .00003 | .00048 | — | — | 70 | 48.7 |
| 12 | — | .165 | .00023 | .00004 | .00080 | — | — | 70 | 48.7 |
| 13 | .0355 | .0247 | .00196 | .00006 | .00140 | — | — | 80 | 60.5 |
| 14 | .0355 | .0313 | .00110 | .00006 | .00078 | — | — | 80 | 60.5 |
| 15 | .0599 | .0418 | .00104 | .00005 | .00114 | — | — | 80 | 59.6 |

[a]Standard conditions - 60° F.; 1 atm.
[b]Caustic bubbler effluent vapor.
[c]Quench column effluent vapor.
[d]Scrubber effluent vapor.

EXAMPLE 6

The following example shows the results obtained using a potassium permanganate scrubbing medium for removing NO. The flue gas scrubbed was obtained from a coal fired utility boiler and the system employed a 3,000 cfm horizontal four-stage spray scrubber. The flue gas contained 400–450 ppm NO, 200–225 ppm $SO_2$, 11% $H_2O$, 7% oxygen and the balance $CO_2$ and $N_2$. The scrubber temperature was maintained at 122° F. Table II below summarizes the conditions under which the scrubbing experiments were carried out and the results.

TABLE II

| Run No. | Gas Flow (scfm)[a] | Liquid Rate (gpm) per Stage | L/G (gal/mscf) per Stage | No. of Stages | NO Concentration (ppm) | | % $NO_2$ Removed | $KMnO_4$ Concentration (gmole/l)[b] |
|---|---|---|---|---|---|---|---|---|
| | | | | | In | Out | | |
| 1 | 1,000 | 56 | 56 | 4 | 425 | 325 | 24 | 0.32 |
| 2 | 1,500 | 56 | 37 | 4 | 425 | 350 | 18 | 0.32 |
| 3[c] | 1,000 | 36 | 36 | 1 | 450 | 430 | 4 | 0.32 |

TABLE II-continued

| Run No. | Gas Flow (scfm)[a] | Liquid Rate (gpm) per Stage | L/G (gal/mscf) per Stage | No. of Stages | NO Concentration (ppm) In | NO Concentration (ppm) Out | % NO$_2$ Removed | KMnO$_4$ Concentration (gmole/l)[b] |
|---|---|---|---|---|---|---|---|---|
| 4[d] | 1,000 | 22 | 22 | 1 | 450 | — | — | 0.33 |
| 5 | 1,000 | 36 | 36 | 2 | 450 | 420 | 7 | 0.33 |
| 6 | 2,000 | 56 | 28 | 4 | 420 | 390 | 7 | 0.32 |
| 7 | 2,000 | 36 | 18 | 4 | 420 | 410 | 2 | 0.32 |
| 8 | 775 | 36 | 46 | 4 | 410 | 287 | 30 | 0.28 |
| 9 | 775 | 50 | 64 | 4 | 410 | 282 | 31 | 0.28 |
| 10 | 775 | 56 | 72 | 4 | 410 | 263 | 36 | 0.29 |
| 11 | 1,300 | 36 | 28 | 4 | 406 | 347 | 15 | 0.33 |
| 12 | 800 | 36 | 45 | 4 | 430 | 307 | 29 | 0.35 |
| 13 | 800 | 56 | 70 | 4 | 430 | 287 | 33 | 0.35 |
| 14 | 800 | 50 | 62 | 4 | 430 | 294 | 32 | 0.35 |
| 15 | 500 | 56 | 112 | 4 | 430 | 229 | 47 | 0.36 |
| 16 | 500 | 36 | 72 | 4 | 450 | 250 | 44 | 0.38 |
| 17 | 500 | 50 | 100 | 4 | 375 | 300 | 20 | 0.35 |
| 18 | 500 | 36 | 72 | 4 | 375 | 300 | 20 | 0.35 |
| 19 | 500 | 22 | 44 | 4 | 375 | 340 | 9 | 0.35 |
| 20 | 500 | 34 | 68 | 4 | 375 | 320 | 15 | 0.35 |
| 21 | 500 | 15 | 30 | 4 | 410 | 340 | 17 | 0.38 |
| 22 | 700 | 50 | 71 | 4 | 410 | 290 | 29 | 0.38 |
| 23 | 700 | 36 | 51 | 4 | 410 | 310 | 24 | 0.38 |
| 24 | 700 | 36 | 51 | 4 | 410 | 310 | 24 | 0.38 |
| 25 | 500 | 36 | 72 | 4 | 440 | 345 | 22 | 0.32 |
| 26 | 1,000 | 50 | 50 | 4 | 440 | 370 | 16 | 0.26 |
| 27 | 1,000 | 45 | 45 | 4 | 450 | 390 | 13 | 0.27 |
| 28 | 1,000 | 36 | 36 | 4 | 450 | 400 | 11 | 0.26 |
| 29 | 1,000 | 56 | 56 | 4 | 450 | 380 | 16 | 0.26 |
| 30 | 1,500 | 56 | 37 | 4 | 430 | 370 | 14 | 0.26 |
| 31 | 1,500 | 45 | 30 | 4 | 430 | 400 | 7 | 0.26 |
| 32 | 1,000 | 56 | 56 | 4 | 425 | 325 | 24 | 0.26 |
| 33 | 1,500 | 56 | 37 | 4 | 425 | 350 | 18 | 0.26 |

[a]Standard condition 60° F.; 1 atm
[b]In aqueous solution buffered at 8 ph 8.6 using sodium bicarbonate
[c]Inlet gas contained 220 ppm SO$_2$; outlet gas contained 10 ppm SO$_2$
[d]Inlet gas contained 220 ppm SO$_2$; outlet gas contained 20 ppm SO$_2$

EXAMPLE 7

To demonstrate the effectiveness of an acid-dichromate solution in removing mercury vapor as per the process of the present invention, synthetic blends of nitrogen and varying amounts of mercury vapor were prepared, the synthetic gas blend then being scrubbed through a one-inch ID column, seven inches in length packed with one-quarter inch Berl saddles. The scrubbing solution was a 0.03 M K$_2$Cr$_2$O$_7$ solution in 80% by weight sulfuric acid. The operating conditions and results are shown below in Table III.

EXAMPLE 8

To demonstrate the effectiveness of the use of a permanganate scrubbing medium in the removal of mercury as per the process of the present invention, synthetic blends of mercury vapor and nitrogen were prepared and scrubbed using a wet electrostatic precipitator as the scrubbing vessel. In Table IV below is shown the conditions employed and the results obtained together with a comparison of the results obtained using de-ionized water as the scrubbing medium.

TABLE III

| Sample No. | Gas Flow Rate (cu. ft./h.) | Scrubber Temp. | Liquid Flow Rate (gal./h.) | L/G Gal/1000 cu. ft. (60° F.) | Inlet Hg Concentration | Outlet Hg Concentration | Percent Removal |
|---|---|---|---|---|---|---|---|
| 1 | 21 | 122° F. | 0.5 | 22 | 0.7 ppb | 0.03 ppb | 96 |
| 2 | 21 | 122° F. | 0.3 | 15 | 1.4 ppb | 0.03 ppb | 98 |
| 3 | 21 | 122° F. | 0.3 | 15 | 3.6 ppb | 0.05 ppb | 98 |
| 4 | 21 | 122° F. | 0.3 | 15 | 9.0 ppb | 0.20 ppb | 98 |
| 5 | 21 | 122° F. | 0.022 | 1.1 | 0.32 ppb | 0.022 ppn | 93 |
| 6 | 21 | 122° F. | 0.022 | 1.1 | 0.32 ppb | 0.006 ppn | 98 |

TABLE IV

| Scrubbing Liquor | Gas Flow Rate (cu ft/hr) | Scrubber Temperature | Liquid Flow Rate (gal/hr) | L/G Gal/MCF (60° F.) | Inlet Hg Concentration | Outlet Concentration | Percent Removal |
|---|---|---|---|---|---|---|---|
| Deionized H$_2$O | 21 | 72° F. | 3.0 | 136 | 2.3 ppb | 2.4 ppb | −4 |
| Deionized H$_2$O | 21 | 72° F. | 3.0 | 136 | 2.3 ppb | 2.2 ppb | 4 |
| 0.5 M KMnO$_4$, 5% H$_2$SO$_4$ Solution | 21 | 72° F. | 3.0 | 136 | 2.3 ppb | 0.22 ppb | 90 |
| 0.5 M KMnO$_4$, 5% H$_2$SO$_4$ Solution | 21 | 72° F. | 3.0 | 136 | 2.3 ppb | 0.17 ppb | 93 |

From the foregoing, it is apparent that the above process provides an effective means for removing from stack gases nitric oxide, mercury and other elements which exist as minor components in the stack gases. Although most effective results are obtained when the acid dichromate or permanganate scrubbing reagent is sprayed cross-current with respect to the flow of the stack gases with the stack gases passing through a substantially unrestricted and horizontal flow path, substantial removal of the nitric oxide and other trace elements is effected by the acid dichromate or permanganate reagent in conventional scrubbing systems.

It is also apparent from the above discussion relating to both the unrestricted horizontal flow process and $NO_x$ removal process that in the removal of nitric oxide or mercury the process involving a scrubbing medium containing an oxidizing agent selected from the class consisting of acid-alkali metal dichromate and permanganate ion provides for the desired results. On the other hand, when removal of sulfur dioxide is of primary importance the use of a calcium hydroxide or lime scrubbing medium is most suitable for economic reasons although a dichromate and permanganate reagent could also be used to effect removal of sulfur dioxide. This then leads to another important aspect of the present invention. With minor modifications of the apparatus and without deviating from the scope of the invention, it is readily apparent that the scrubbing zone defined by the chamber could be extended to incorporate one or more stages of different reagents. These reagents would be added through a separate cycle similar to those discussed above. That is, the cycle would include a separate mixing tank and one or more slurry tanks depending on the number of stages used. As before, the reagent would be pumped from the mixing tank or a slurry tank to the nozzle or nozzles at a stage and sprayed across the chamber and thus across the flow path of the stack gases. This would initiate at that stage the scrubbing, washing, and discharging steps in substantially the same manner as heretofore described. Preferably, the liquid slurry discharged from the upstream stage would be recycled to the mixing tank after solids were bled therefrom. It should be noted that the horizontal cross-flow scrubber is particularly adapted for such a multi-reagent process because there would be no interference or mixing of the reagent sprays as there would be in vertical tower scrubber and because plugging is eliminated, various reagents can be used.

It is apparent that such a multi-reagent process and apparatus for carrying out such a process would be particularly useful where it is desired to remove both $SO_2$ and NO from the stack gases. In this instance, a lime solution reagent in one cycle would be employed for the removal of $SO_2$ and the use of permanganate or dichromate in another cycle would be used for the removal of $NO_x$.

Thus, with the multi-stage, separate reagent cycle arrangement in the horizontal cross-flow scrubber of the present invention, it is possible to remove some of the particulate matter in earlier stages, remove the $SO_2$ in the next stages and remove the oxides of nitrogen in the latter stages. It is also possible that scrubbing with a basic solution followed by scrubbing with an acidic solution will result in removal of other trace amounts of elements which otherwise would be emitted with the stack gases.

In summary, the present invention provides first and foremost an overall process for scrubbing stack gases which is more efficient, effective and economical than those heretofore used. Moreover, particularly effective means are disclosed for removing NO and trace elements such as mercury and the like whether it be used alone or as part of or as a stage process in which the stack gases move through a substantially unrestricted horizontal flow path.

Having fully described my invention, it is to be understood that I do not wish to be limited to the details herein set forth, but my invention is of the full scope of the appended claims.

I claim:

1. A process for removing gaseous and particulate pollutants from stack gases, wherein the steps comprise:
    passing the stack gases through a defined substantially horizontally extending flow path having a substantially unrestricted cross-sectional flow area throughout the length thereof to avoid any substantial pressure drop;
    spraying into the flow path at least a slurry comprising calcium sulfate and, calcium hydroxide reagent for contact with the stack gases therein and thereby effecting by said reagent removal of pollutants including $SO_2$, $SO_3$, As, B, Be, Cd, Cr, Hg, Mn, Ni, Pb, and V, when present, from the stack gases passing therethrough; and
    discharging to discharge means pollutant laden liquid impinging on the side walls of said flow path by washing said discharging pollutant laden liquid into said discharge means by subsequently impinging liquid droplets.

2. A process of claim 1, wherein the stoichiometric ratio of said calcium hydroxide reagent with respect to sulfur dioxide in said passing stack gases for the calcium hydroxide-sulfur dioxide reaction is within the range of about 1.0–2.0.

3. The process of claim 2, wherein said stoichiometric ratio is preferably about 1.05.

4. The process of claim 1, wherein said slurry sprayed into said flow path at a flow rate within a range of about 10–15 GPM per flow rate of said stack gases therein of about 1000 CFM.

5. The process of claim 4, wherein the flow rate of said slurry is about 37.5 GPM/1000 CFM of stack gas flow.

6. The process of claim 1, wherein said reagent is sprayed substantially vertically downward and across said flow path in a substantially perpendicular direction thereto.

7. The process of claim 6, wherein said reagent is sprayed substantially vertically downward and across said flow path in said substantially perpendicular direction thereto and also in a direction partly counter-current to the direction of the stack gases passing through said flow path to further avoid any substantial entrainment of said reagent within the stack gases passing through the flow path.

8. A process for removing gaseous and particulate pollutants from stack gases including oxides of nitrogen and mercury vapor comprising the steps of:
    passing the stack gases through a defined substantially horizontally extending flow path having a substantially unrestricted cross-sectional flow area throughout the length thereof to avoid any substantial pressure drop;
    spraying into the flow path at least a liquid reagent including an oxidizing agent selected from the class consisting of acid-alkali metal dichromate and permanganate ion for contact with the stack gases therein and thereby effecting by said reagent removal of pollutants, including oxides of nitrogen and mercury vapor, from the stack gases passing therethrough; and discharging to discharge means pollutant laden liquid impinging on the sidewalls of said flow path by washing said discharging pollutant laden liquid into said discharge means by subsequently impinging liquid droplets.

9. The process of claim 8, wherein said oxidizing agent comprises a sulfuric acid solution of an alkali metal dichromate.

10. The process of claim 9, wherein the concentration of sulfuric acid in said liquid reagent is from about 40 to about 98% by weight.

11. The process of claim 8, wherein said oxidizing agent comprises permanganate ion.

12. The process of claim 11, wherein said liquid reagent has a pH ranging from about 6 to about 12.

13. The process of claim 12, wherein said permanganate ion is present in amounts ranging from 1.0 to about 20% by weight.

14. The process of claim 8, wherein said liquid reagent is sprayed across said scrubbing zone at a plurality of stages.

15. The process of claim 14, wherein said pollutant laden liquid discharged from each of said spraying stages except one said spraying stage is collected, pumped to a next adjacent stage, and sprayed across said scrubbing zone at said adjacent stage.

16. The process of claim 15, wherein said one spraying stage is the upstream spraying stage and said adjacent stages are upstream of stages from which the pollutant laden liquid is discharged.

17. The method of claim 16, wherein said pollutant laden liquid discharged from said upstream stage is recycled to the downstream stage.

18. The method of claim 8, wherein said liquid reagent is sprayed across said chamber at four stages.

19. A process of wet scrubbing stack gases, wherein the steps comprise:

passing the stack gases through a scrubbing zone consisting of a substantially horizontally extending flow path having a substantially unrestricted cross-sectional flow area throughout the length of said flow path to avoid any substantial pressure drop in said scrubbing zone;

spraying a liquid reagent across said scrubbing zone and substantially perpendicular to said path of flow to substantially cover the cross-sectional flow area of said path with liquid spray droplets at least at one stage along the length thereof whereby pollutants contained within said stack gases are removed therefrom by said spray droplets;

washing the pollutants laden liquid in said scrubbing zone with subsequently emitted liquid spray to cause the pollutant laden liquid to move to the bottom of said scrubbing zone; and discharging the pollutant laden liquid from said scrubbing zone which has been washed to the bottom thereof.

20. A gas purification process comprising intimately contacting a stack gas stream comprising nitric oxide and mercury vapor as minor components in a scrubbing zone with a liquid scrubbing medium containing an oxidizing agent comprising an acid-alkali metal dichromate for removing mercury vapor from the stack gas stream and for oxidizing and removing nitric oxide from the stack gas stream thereby producing a scrubbed stack gas stream.

21. The process of claim 20, wherein said oxidizing agent comprises a sulfuric acid solution of an alkali metal dichromate.

22. The process of claim 21, wherein said gas stream contains water and the temperature of said scrubbing medium is maintained within about a 30° C. range of a level at which the vapor pressure of water over said scrubbing medium equals the partial pressure of said water in said gas stream.

23. The process of claim 22, wherein said temperature in said scrubbing medium is maintained at a level such that the vapor pressure of water over said scrubbing medium is maintained at substantially the same level as the partial pressure of said water in said gas stream.

24. The process of claim 21, wherein the concentration of sulfuric acid in said scrubbing medium is from about 40 to about 98% by weight.

25. The process of claim 24, wherein the concentration of sulfuric acid in said scrubbing medium is from about 50 to about 85% by weight.

26. The process of claim 22, wherein said alkali metal dichromate is present in said scrubbing medium in amounts ranging from about 0.1 to about 3% by weight.

27. The process of claim 22, wherein said scrubbing medium is regenerated.

28. The process of claim 20, wherein said stack gas stream is obtained as a product of the combustion of a fossil fuel.

29. The process of claim 20, wherein said nitric oxide is present in an amount of less than 0.5% by volume.

30. A gas purification process comprising intimately contacting a stack gas stream comprising nitric oxide and mercury vapor as minor components in a scrubbing zone with a liquid scrubbing medium containing an oxidizing agent comprising permanganate ion for removing mercury vapor from the stack gas stream and for oxidizing and removing nitric oxide from the stack gas stream, thereby producing a scrubbed stack gas stream.

31. The process of claim 30, wherein said scrubbing medium has a pH ranging from about 6 to 12.

32. The process of claim 30, wherein said permanganate ion is present in amounts ranging from about 1.0 to about 20% by weight.

33. The process of claim 31, wherein said permanganate ion is present in amounts ranging from about 1.0% to about 20% by weight.

34. The process of claim 33, wherein said permanganate ion is derived from potassium permanganate.

* * * * *